Figure 1:
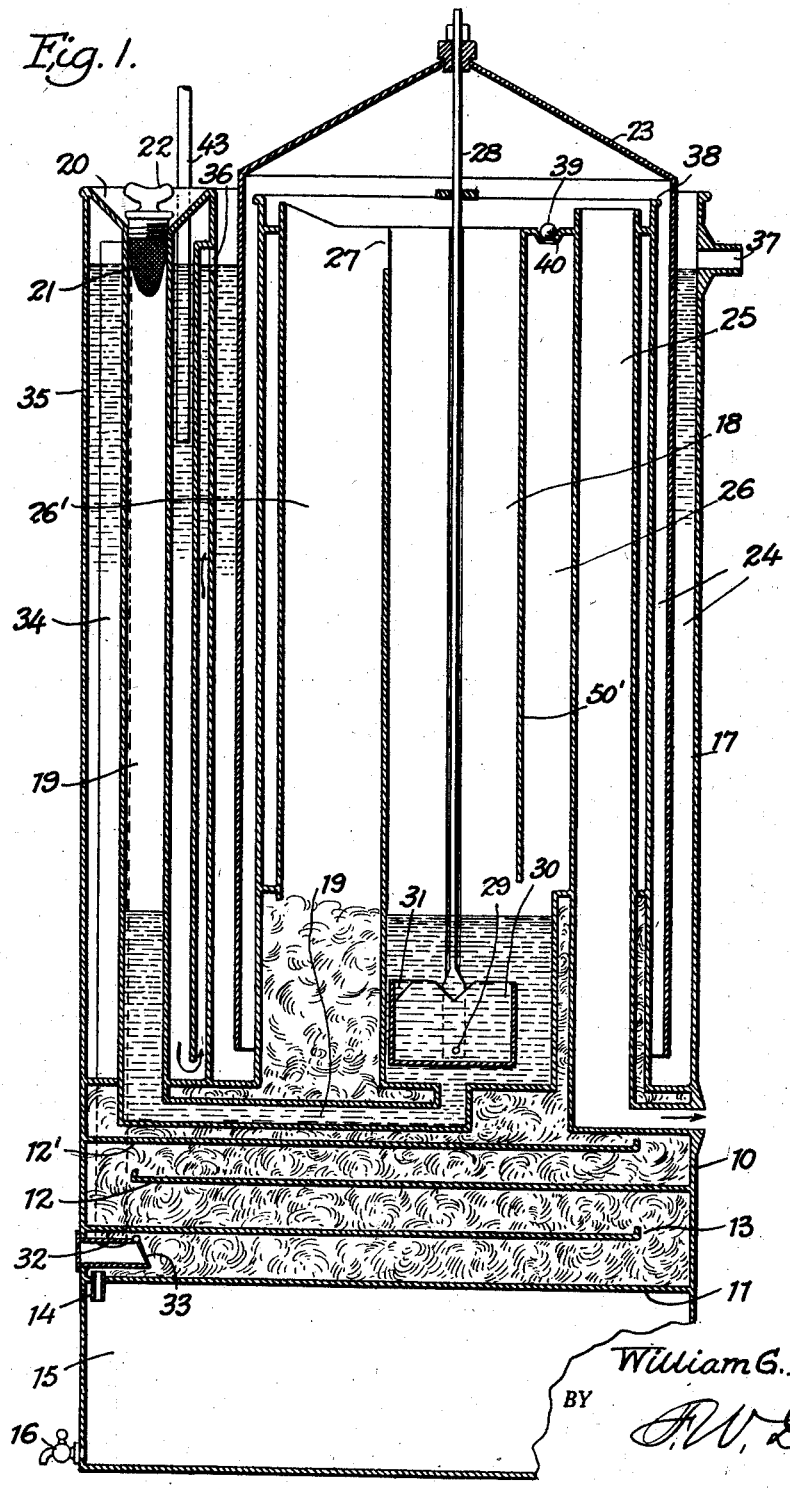

Sept. 9, 1930.  W. G. PAQUETTE  1,775,372
GAS GENERATOR
Filed June 17, 1929  2 Sheets-Sheet 1

INVENTOR.
William G. Paquette
BY
ATTORNEY.

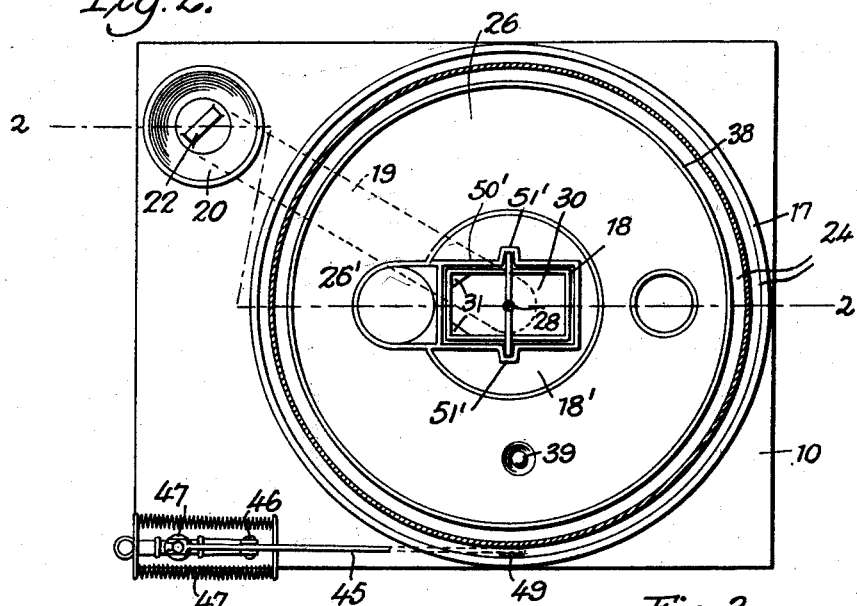
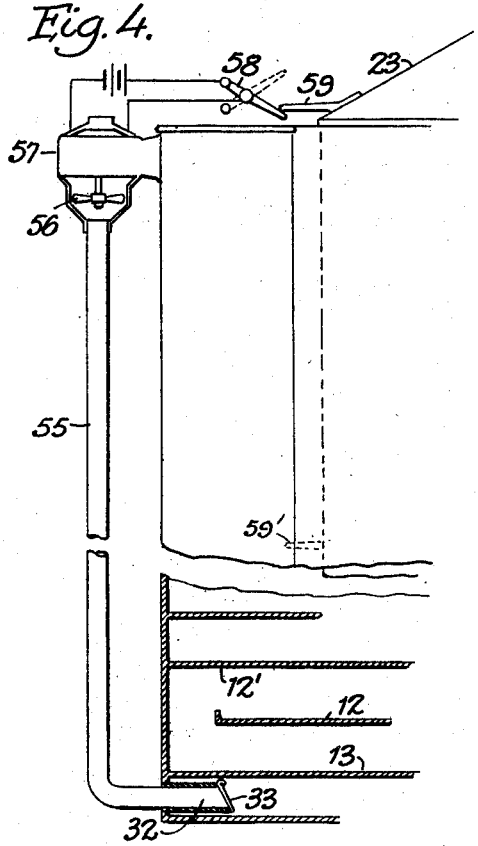
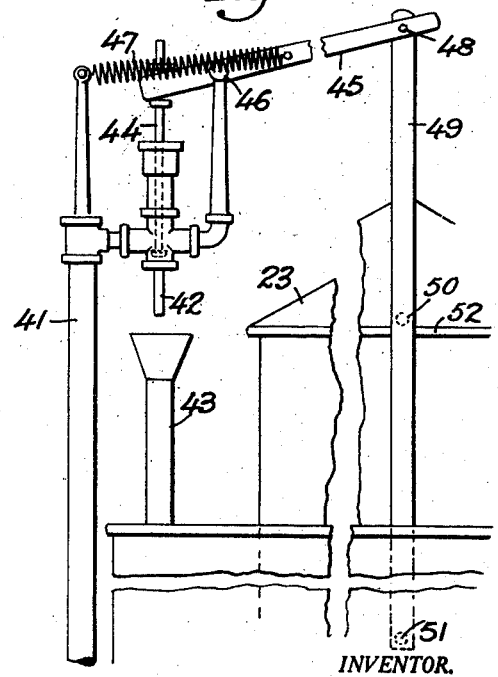

Patented Sept. 9, 1930

1,775,372

UNITED STATES PATENT OFFICE

WILLIAM G. PAQUETTE, OF ASHEVILLE, NORTH CAROLINA

GAS GENERATOR

Application filed June 17, 1929. Serial No. 371,604.

My said invention relates to a gas generator and it is an object thereof to provide a device of this character which is particularly suitable for domestic use in that it is very compact and does not require elaborate connections in order to fit it up for use in the home. The device is simple in construction and can be manufactured at a low cost. It is so made as to utilize ordinary gasoline or like fuel as a source of gaseous fuel together with water and air and is so made that the overflow of water can be used for any ordinary purpose, while the heavier part of the liquid fuel which is not readily vaporized at ordinary temperatures can readily be drawn off and used in an internal combustion engine. Customarily such portion of the liquid fuel is used with entire success in any ordinary automobile.

A further object of my invention is to provide improved automatic means for supplying water, air and fuel to the device, said means being controlled by the quantity of gaseous fuel in such a way that a full charge of the fuel will be ready for use in a gas stove or other suitable appliance. It is to be understood that the device is suitable for use not only for automatic heating and cooking but also for such purposes as lighting, welding and in fact for any purpose to which fuel gas is applicable.

My invention is in some respects an improvement upon that disclosed in my application Serial No. 344,394, filed March 5, 1929, and reference may be had to that application for fuller disclosure of certain details of structure.

Referring to the drawings, which are made a part of this application and in which similar reference characters indicate similar parts:

Fig. 1 is an elevation of my device, partly in section to illustrate the internal construction, on line 2—2 of Fig. 2, Fig. 2, a plan of the same, with parts omitted, Fig. 3, a detail of certain controlling means, and Fig. 4, an elevation, partly in section, of a modified form.

In the drawings reference character 10 indicates the square lower part of the casing which forms the casing of a carburetor having a bottom 11 and shelves 12, 12' and 13 secured to or supported by the walls of said square lower part, said shelves terminating alternately short of the one or the other of two opposite sides of said chamber thereby causing a circulation in a zigzag path of the gasoline and the vapor arising therefrom. The spaces between the shelves may be provided with screens or any other desirable or conventional means for facilitating vaporization of the gasoline or other suitable liquid fuel. A short section of pipe 14 extends through the bottom for carrying off the unvaporized residue into a storage compartment 15 provided with a faucet 16 by means of which such residue may be withdrawn and used in an ordinary internal combustion engine such as that of an automobile.

A cylindrical casing 17 extends upward from the base 10 and is provided with a well 18 located centrally of an internal gasoline storage chamber 26. A passing 19 leads to the chamber 18, the upper end of the passage being formed as a funnel 20 and supporting a screen 21. A filling plug 22 rests on the supporting rim of the screen. A bell 23 provides an expansible storage chamber for gas, this bell extending down into an annular chamber 24, adapted to hold water to serve as a water-seal for the gas storage chamber. A passage 25 opens underneath the bell and leads outward to whatever instrumentality is to be operated by the gas, such as a stove, gas lighting means, welding devices or other means utilizing gas for any conventional or desirable purpose. The annular chamber 26 surrounds the gasoline well 18, this chamber having a passage 26' provided at its upper end with an opening indicated at 27. A rod 28 extends downward from the bell and is pivotally connected at 29 to a bucket 30 which is weighted at one side as indicated at 31. When the bell is in its lowermost position the bucket will be filled with liquid fuel and when the bell rises to its highest position the bucket will swing counterclockwise, so that the fuel will be dumped through the port 27 into the passage 26' whence it will flow down into the chamber 26 and thence into the carburetor. The vapor generated in the carburetor rises in the passage 26' and passes through the port 27 into the storage chamber underneath the bell.

The carburetor is provided at one side with an inset pipe 32 which is closed by a one-way valve 33, the valve preventing escape of gas through a pipe 34 by which air is supplied to the carburetor through pipe 32 and valve 33. The pipe 34 is located in a water jacket 35 about the gasoline passage 19. An overflow outlet indicated at 36 communicates with the chamber 24 and this chamber has an overflow outlet at 37, both outlets being located at such an elevation as to prevent entrance of water into pipe 34 or over the top of the wall 38 within which the passages 25 and 26' are located.

A ball valve 39 rests in a depression in the upper wall of the gasoline storage chamber, this ball closing a port 40 to prevent escape of gasoline vapor when the device is not in use, such gasoline vapor being otherwise liable to enrich the gas in the bell to an undesirable extent. This valve permits gas to escape from the chamber at times when the bucket is dumping its contents into passage 26'.

A device is indicated in Figs. 2 and 3 for forcing air into the carburetor, such device being generally similar to that in my application above referred to. This device comprises a water supply pipe 41 with an outlet 42 so located as to throw a jet of water into a pipe 43 leading into water jacket 35. A valve 44 normally shuts off the water, this valve being operated through a lever 45, pivotally supported at 46 and movable quickly in well-known manner to either one of two extreme positions by over-center springs 47. The lever is pivoted at 48 to a rod 49, which rod is guided for movement alongside the bell and is provided with two pins 50 and 51. As the bell approaches the upper limit of its movement a ledge at 52 strikes pin 50 to raise the rod 49 and close the valve, and when the bell descends far enough the ledge strikes pin 51 to pull down on rod 49 and open the valve. The jet of water carries air with it into the water jacket 35, which air rises to the top and so is forced down pipe 34 and so into the carburetor.

Preferably guiding means is provided for bucket 30, comprising an encircling wall 50' with two oppositely located jogs 51' and the rod 28 is formed as a yoke at its lower end, each arm of the yoke being guided in one of said jogs. This insures straight-line travel of the bucket and prevents accidental tilting of the same.

In the modified form of my invention illustrated in Fig. 4 a pipe 55 is shown as connected to the pipe 32 and an electric fan 56 is located at the other end of the pipe said pipe being driven by a motor 57 controlled by a circuit closer 58. The circuit is closed by an arm 59 on the bell 23 when the bell approaches the lower limit of its movement, whereupon the motor will start and drive the fan to force air into the carburetor and through the fuel liquid therein, thus generating gas to fill the storage chamber underneath the bell. A similar arm 59' lower down on the bell opens the circuit when the bell reaches the upper limit of its movement.

In the operation of my device in the preferred form shown in Figs. 1 to 3, assuming the parts to be in the position shown in Fig. 1, the gas in the expansible chamber underneath the bell is substantially exhausted and the valve 44 is therefore open. The jet of water from pipe 42 is therefore flowing into pipe 43 carrying air down into the casing 35. The pressure of the entering air and water force the air in the upper part of said casing down through pipes 34 and 32 and past valve 33 into the carburetor where it passes in a zigzag path determined by the shelves 12, 12', and 13 up through the carburetor and through any devices therein intended to assist in the vaporization. The air, enriched by the vapor of the liquid fuel, then passes up through passage 26' and opening 27 to the space underneath the bell. As the vaporous fuel accumulates underneath the bell it will cause the bell to rise and to carry up with it a bucket 30 which is now full of gasoline. When the bucket has been carried up far enough it will be tilted to the left by the action of weights 31 so as to empty its contents through the opening 27 into the passage 26', thus providing a new charge of vaporizible fuel to the carburetor. As the fuel is vaporized without application of heat some of it will remain in liquid state and will pass through pipe 14 to the storage chamber 15 from which it can be drawn off from time to time by the spigot 16. As the bell approaches its highest position the ledge 52 will strike pin 50 and move the lever 45 until it has passed its central position, and thereupon the over-center springs 47 will cause it to close suddenly, stopping the jet of water and thus causing the air to cease moving down pipe 34 to the carburetor. The parts will remain in the positions just described until the vaporous fuel has been used, such fuel passing off through passage 25. When the vaporous fuel has been used up to such an extent as to permit the bell to approach nearly to the downward limit of its movement the ledge 52 will strike pin 51 and again open the valve 44 whereupon the sequence of operations will be repeated. It will be understood that the water passes from casing 35 into the water-seal chamber 24, the surplus passing out through port 37. The operation of the modified form in Fig. 4 is substantially similar except that the amount of air is furnished by fan 56 instead of by water jet, the water-seal being maintained about the bell in any conventional or desirable manner.

It will be obvious to those skilled in the art that various other modifications may be made in my device without departing from the spirit of my invention and, therefore, I do not limit myself to what is shown in the drawings and described in the specification but only as set forth in the appended claims.

Having thus fully described my said invention what I claim as new and desire to secure by Letters Patent is:

1. In a gas generator, a receiving compartment for gas, a bell in said compartment, means providing a water seal for the bell, a carburetor communicating with the space underneath the bell, means for supplying combustible liquid to the carburetor, and means controlled by the bell for controlling the flow of such liquid including a tiltable bucket connected to the bell for up and down movement therewith, a receptacle for gasoline positioned to fill the bucket when the bucket is lowered, and means whereby the bucket is caused to dump its contents into said passage when the bucket is elevated.

2. In a gas generator, a carburetor, an expansible storage chamber for gas, including a bell, a storage chamber for gasoline, a chamber providing a water-seal for the bell and a water jacket for the gasoline storage chamber, means for supplying gasoline in predetermined amounts to said carburetor, means for supplying air to said carburetor, a passage leading from said carburetor to said expansible chamber, and means governed by a movable wall element of said expansible chamber for controlling the air and gasoline supplying means.

3. In a gas generator, a carburetor, an expansible storage chamber for gas including a bell, a storage chamber for gasoline, an external passage leading to said gasoline storage chamber, communicating chambers providing a water jacket for said gasoline storage chamber and said passage one of said chambers also providing a water-seal for said bell, means for supplying gasoline in predetermined amounts to said carburetor, means for supplying air to said carburetor, a passage leading from said carburetor to said expansible chamber, and means governed by a movable wall element of said expansible chamber for controlling the air and gasoline supplying means.

4. In a gas generator, a carburetor, an expansible storage chamber for gas, a storage chamber for gasoline, a partition shutting off said expansible chamber from said gasoline storage chamber, a well opening through said partition, means for supplying gasoline in predetermined amounts from said well to said carburetor, means for supplying air to said carburetor, a passage leading from said carburetor to said expansible chamber, and means governed by a movable wall element of said expansible chamber for controlling the air and gasoline supplying means.

5. In a gas generator, a movable bell-shaped gas container, means providing a water seal for the bell, a fuel chamber within said bell and said water seal; a carburetor communicating with said gas container, means for supplying fuel from said fuel chamber to said carburetor, and means for supplying air to said carburetor.

6. In a gas generator, a movable bell-shaped gas container, means providing a water seal for the bell, a fuel chamber within said bell and said water seal; a carburetor underneath said fuel chamber and water seal, said carburetor including a series of shelves spaced vertically from one another and providing a tortuous passage leading toward said gas generator, means for supplying fuel to said passage from said fuel storage chamber at a point near the gas container, and means for supplying air to said passage at a point remote from said gas container.

7. In a gas generator, a movable bell-shaped gas container, means providing a water seal for the bell, a fuel chamber within said bell and said water seal; a carburetor, a well within the fuel chamber, a bucket in the well said bucket depending from said bell, a passage adjacent the well leading to the carburetor, and means for tilting the bucket to dump its contents into said passage as the bucket approaches the upper limit of its movement.

In testimony whereof I affix my signature.

WILLIAM G. PAQUETTE.